Figure 1:
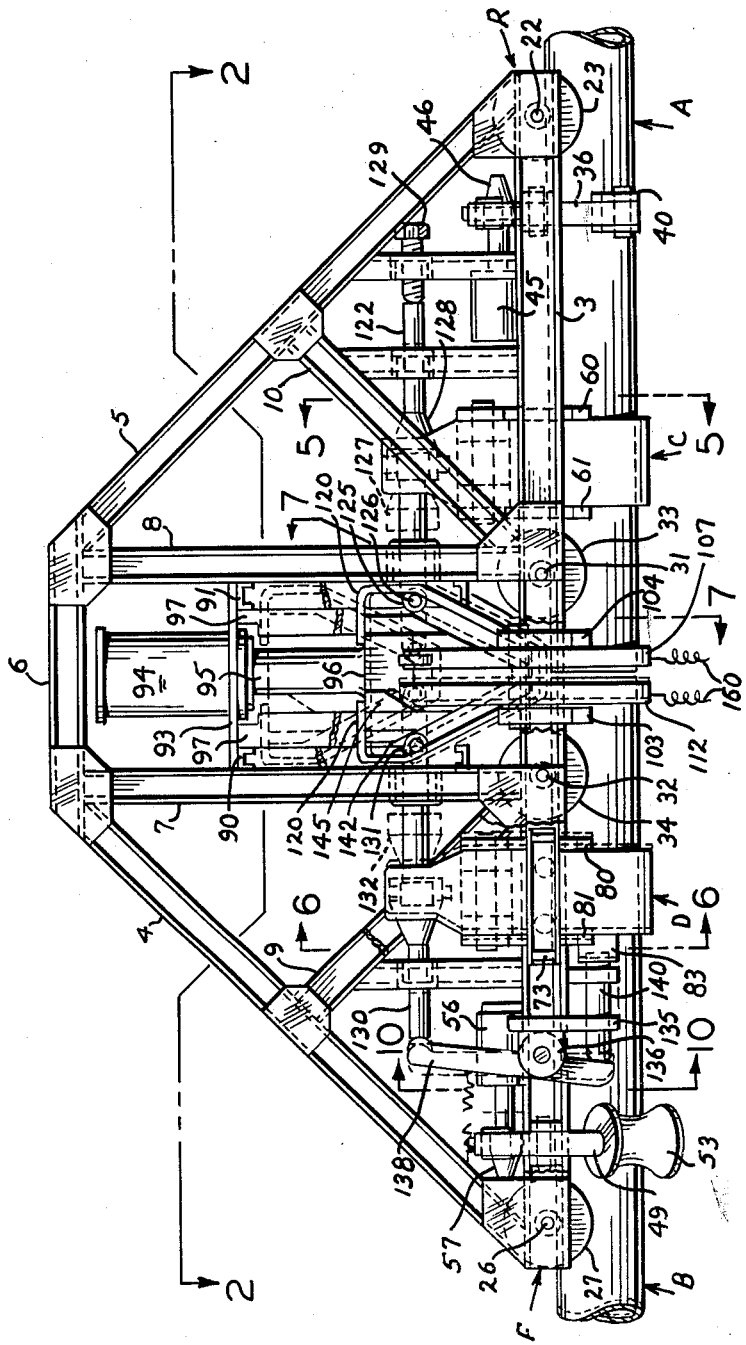

INVENTOR.
Luther D. Totten,
BY Loyal J. Miller
ATTORNEY

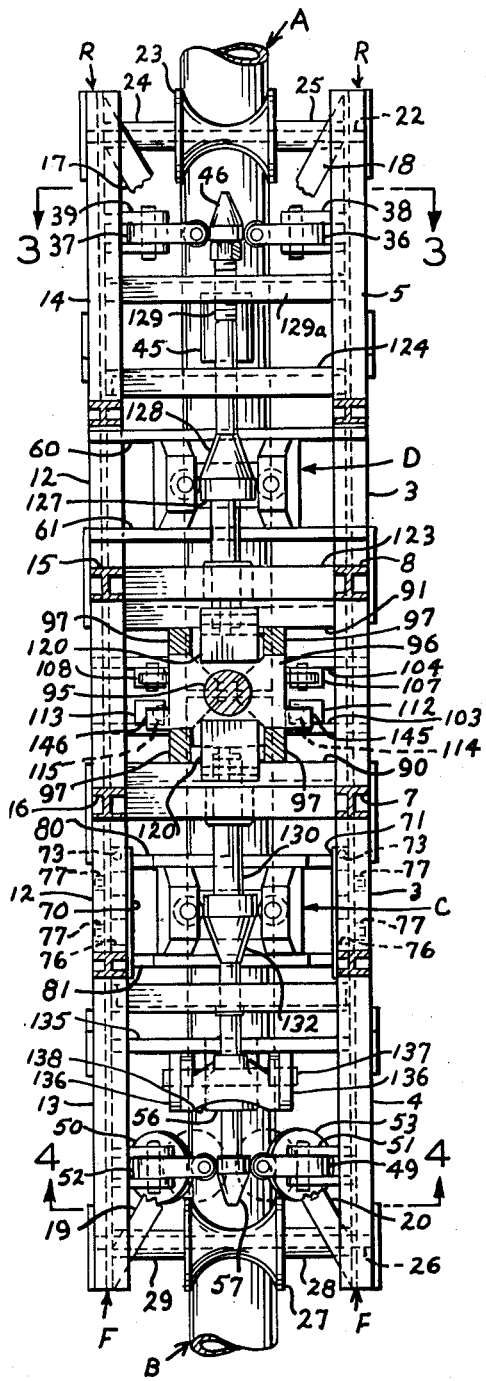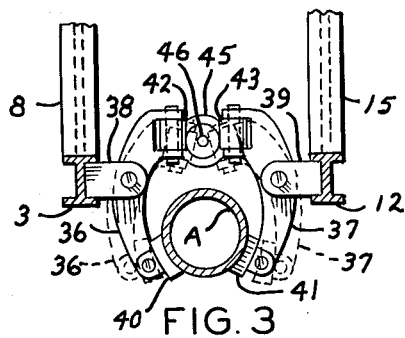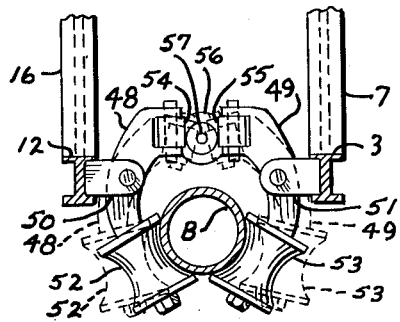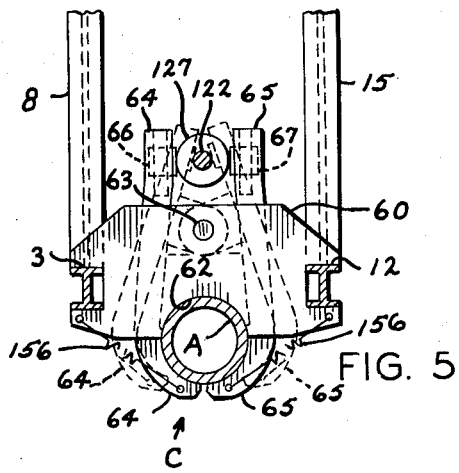

Sept. 4, 1956 L. D. TOTTEN 2,761,952
WELDING FRAME
Filed Oct. 6, 1954 3 Sheets-Sheet 3
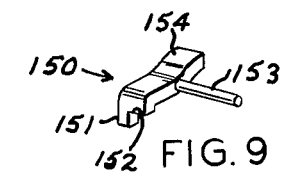
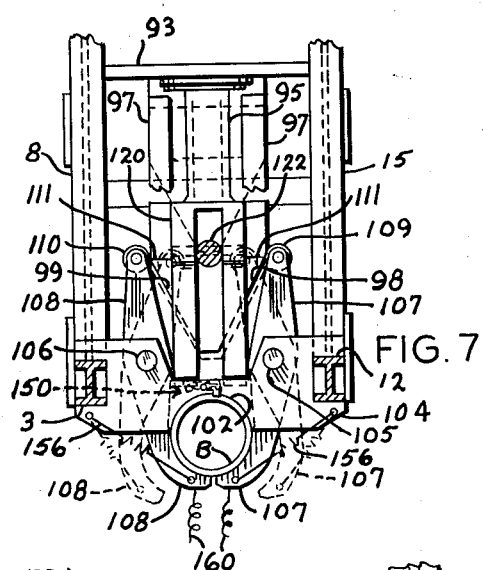
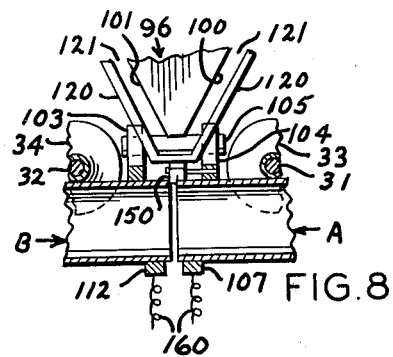
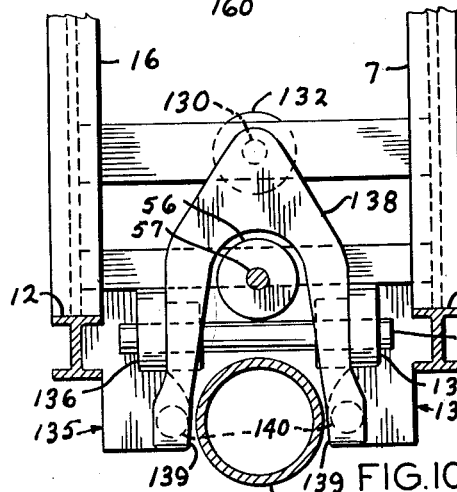
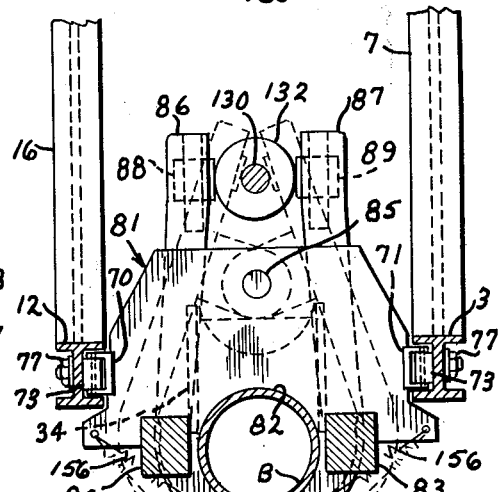
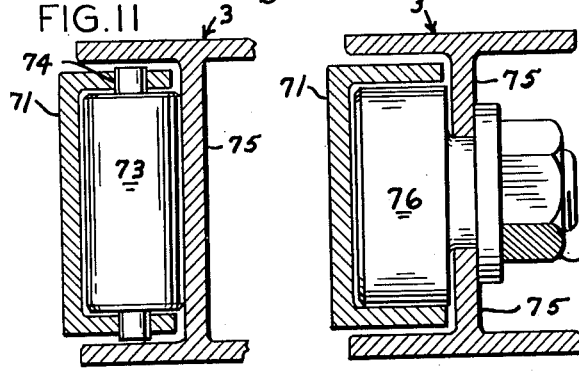
Luther D. Totten
INVENTOR.
BY Loyal S. Miller
ATTORNEY

United States Patent Office 2,761,952
Patented Sept. 4, 1956

2,761,952

WELDING FRAME

Luther D. Totten, Long Beach, Calif.

Application October 6, 1954, Serial No. 460,669

8 Claims. (Cl. 219—101)

The present invention relates to apparatus for holding work to be flash or pressure welded, and more particularly to an apparatus for axially aligning and forcing the adjacent ends of two sections of pipe together to pressure weld the same. The present invention is an improvement over my application now on file in the United States Patent Office, filed May 4, 1953, for Welding Frame, Ser. No. 352,733, Division 14.

The term "flash weld" is used herein to designate that type of welding which is accomplished by connecting a source of electrical power to two oppositely disposed bodies of metal, of substantially equal cross sectional area, by means of suitable wiring, clamps etc. With the proper amount of current turned on the two bodies are brought together and the electrical current arcs between them just before they are brought into contact. This electrical arc and the flow of electric current as the two bodies touch heats the adjacent ends of the metal to a fusion temperature which allows a portion of the metal to be "up-set" under pressure thus insuring a fusion weld of the adjacent ends of the metal.

The term "pressure weld" as used herein refers to a method of joining the adjacent ends of pipe or the line by a controlled application of heat and pressure. This is accomplished by providing a pair of burners which surround the end portion of each joint of pipe and which are operatively connected to a source of fuel such as oxygen cylinders and acetylene generators. The burners are lit and are adjusted to direct a circumferential ring of flame against the oppositely disposed ends of pipe to heat the metal. When the metal has been heated sufficiently the two ends of pipe are forced together by power means which causes the adjacent ends of the pipe to be bonded by diffusion and recrystallization. This type of weld is difficult to make unless sufficient power is available to force the heated ends of the metal together at the proper instant. While similar in principle to forge welding and electric resistance welding, pressure welding differs from these welds in that the parts to be joined are not heated to the fusion temperature.

Under present conditions it has not been found feasible to pressure weld "big-inch" pipe in the field. The operation of welding such large diameter pipe (10 to 36 inches), has presented three primary problems, namely, (1) getting the sections into axial alignment, (2) "rerounding" the pipe ends which are not truly circular, and (3) forcibly abutting the adjacent ends together under sufficient pressure to upset the metal and effect a satisfactory weld.

The principal object of the present invention is to provide an apparatus which will mechanically solve these three problems.

Under present day conventional practice, the welding of large diameter pipe takes place on the earth's surface at the side of the ditch into which the welded pipe is to be later lowered. The initial or general aligning of the two sections to be welded together is accomplished by blocking or "shimming-up" under their adjacent ends, and by rotating one or both sections until two oppositely disposed exterior surfaces of one section are brought into even alignment, or registration, with two similarly disposed surfaces of the other section. One or both sections of the pipe is usually "out-of-round" due to the lap welding process, and to handling and shipping. It is desirable that the longitudinal lap-welded seams be "staggered," so that they do not meet at the abutted end of the pipe, thereby preventing the pipe from splitting for the length of several joints, in case internal pressure ruptures the pipe. Thus it seems evident that, even if the pipe sections are similarly "out-of-round" in a similar manner from lap welding the longitudinal seams, this staggering of the sections will preclude the two sections meeting properly for flash or pressure welding. It has been found that a pressure of approximately 10,000 pounds per square inch is necessary to pressure weld pipe. To date, no one has devised an apparatus which will deliver such an amount of pressure to the meeting ends of large diameter pipe which is also portable and may be used in the field. The present invention is power operated and is designed to force the adjacent ends of two sections of pipe together under pressures up to approximately 40,000 pounds per square inch.

It is generally conceded from the above that the present day conventional methods prevent pressure welding large daimeter pipe in the field.

Another object of the present invention is to provide an apparatus for the purposes described, which is maneuverable along the pipe string by power driven tractor equipment.

Another object of the present invention is to provide an apparatus which will clamp the adjacent ends of the pipe sections and press them both into truly circular condition.

A further object is to provide an apparatus which will grip each section of the pipe in two or more places, and forcibly align the sections axially and bring their adjacent ends together under sufficient pressure to be electrically welded.

An additional object is to provide an apparatus that may be used for flash or pressure welding any type of tubular materials.

Other objects will be apparent from the following description when taken in conjunction with the accompanying three sheets of drawings, wherein:

Figure 1 is a side elevational view;
Figure 2 is a top view;
Figure 3 is a fragmentary vertical sectional view taken substantially along line 3—3 of Fig. 2;
Figure 4 is a fragmentary vertical sectional view taken substantially along line 4—4 of Fig. 2;
Figure 5 is a fragmentary vertical sectional view taken substantially along line 5—5 of Fig. 1;
Figure 6 is a fragmentary vertical sectional view taken substantially along line 6—6 of Fig. 1;
Figure 7 is a fragmentary vertical sectional view taken substantially along line 7—7 of Fig. 1;
Figure 8 is a fragmentary vertical sectional view of the lower central portion of the device;
Figure 9 is a perspective view of one part of the device;
Figure 10 is a fragmentary vertical sectional view taken substantially along line 10—10 of Fig. 1;
Figure 11 is a fragmentary vertical sectional view of a part of the device; and
Figure 12 is a view similar to Fig. 11, showing another part of the device.

Like characters of reference designate like parts in those figures of the drawings in which they occur.

In the drawings:
Reference numerals 1 and 2 indicate, as a whole, two substantially identical side members which are preferably fabricated from structural steel H-beams. The exact construction of the two side members need not be specifically described other than that they must be rigid and sufficiently strong enough to withstand the stresses which are to be placed upon them, as is more fully described hereinbelow. The frame member 1, as illustrated in Fig. 1, includes a horizontal beam 3, two upwardly slanting stringers 4 and 5, and a horizontal header 6. Suitable vertical posts 7 and 8 are provided upon the beam 3 to support the header and the stringers, and suitable braces 9 and 10 are also provided upon the beam 3 for strengthening the entire side member. The various elements (3 through 10) are united at their various points of juncture by riveting or weld-integration.

The side member 2 is preferably identical in construction as the above described side member 1, and includes a longitudinal horizontal beam 12, upwardly slanting stringers 13 and 14, suitable vertical posts 15 and 16, suitable braces, and a horizontal header, not shown, but which corresponds in location and performance to the braces 9 and 10 and header 6 of the side member 1.

The side members 1 and 2 are held in rigid spaced parallel relation by a plurality of suitable cross-beams 17—18, 19—20, and the two headers are connected by suitable transverse beams, not shown. The lower portions of the side members 1 and 2 are further rigidly braced by transverse channels and plates, as more fully described hereinbelow.

The over-all A-frame thus constructed of the two spaced side members 1 and 2, may be varied in length and width to accommodate the diameter of the pipe to be received and welded together. As viewed in Fig. 1, the A-frame moves along the work to the left; the letter F indicates the forward end of the beams 3 and 12, and the letter R indicates the rear end.

The beams 3 and 12 are alignedly perforated transversely adjacent the remote rear end R to receive a horizontal axle or pivot pin 22, which journals a groove-faced roller 23. The radius of the groove in the face of the roller 23 is substantially complemental to the superficial radius of a pipe-section A, so that when the roller is brought into contact with the pipe section, the groove prevents lateral movement of the pipe. The roller 23 is centrally held between the beams 3 and 12 by a pair of spacers 24 and 25 around the pin 22 on each side, respectively, of the roller. Similarly adjacent the other front remote end F, the beams 3 and 12 are alignedly perforated transversely to receive a horizontal pivot pin 26 which journals a similar roller 27 between similar spacers 28 and 29.

Adjacent their point of juncture with the posts 8 and 15, and 7 and 16, the beams 3 and 12 are alignedly perforated transversely to receive horizontal axle or pivot pins 31 and 32, respectively. Rollers 33 and 34, identical with relation to the rollers 23 and 27, are similarly journaled on the pins 31 and 32, respectively, and are centrally held between the beams 3 and 12 by spacers, not shown. The rollers 23, 27, 33 and 34 rollably support the A-frame in a mobile manner on the pipe-section A and an adjoining pipe-section B.

A pair of oppositely disposed arcuately curved vertical clamping arms 36 and 37 are pivotally connected intermediate their ends between two pairs of suitable lugs 38 and 39, respectively, rigidly carried by the beams 3 and 12, respectively, adjacent the rollers 23. The side configuration of the arms 36 and 37 is more clearly shown in Fig. 3. Clamping shoes 40 and 41 are pivotally connected to the depnding ends of the arms 36 and 37, respectively. The faces of the clamping shoes 40 and 41 are arcuately grooved and substantially complemental with the superficial radius of the pipe-section A. The purpose of the shoes 40 and 41 is to grip the pipe-section A in co-operation with the roller 23, when the depending ends of the arms 36 and 37 are pivoted toward the pipe, as more fully described hereinbelow. The upper ends of the arms 36 and 37 each carry a roller bearing 42 and 43, respectively, journaled on a vertical axis for the purposes as will be presently apparent. A suitable power-operated cylinder 45, for example a hydraulic cylinder, is centrally rigidly mounted longitudinally to the A-frame adjacent the upper ends of the arms 36 and 37 (Fig. 1). The cylinder 45 has a horizontal protruding cylindrical piston rod having a conical end 46. Actuation of the cylinder 45 extends the piston rod 46 into contact with the rollers 42 and 43, pivoting the arms 36 and 37 outwardly at their upper ends to cause the shoes 40 and 41 to grip the pipe-section A, as is shown in solid lines in Fig. 3. Retraction of the rod 46 releases the arms 36 and 37 and allows the release of the shoes 40 and 41 from contact with the pipe A, as is shown in dotted lines (Fig. 3).

A similar pair of oppositely disposed arcuately curved vertical clamping arms 48 and 49 are pivotally connected intermediate their ends between two similar pairs of lugs 50 and 51, respectively, rigidly carried by the beams 3 and 12 adjacent the roller 27 (Fig. 4). The depending ends of the arms 48 and 49 are each adapted to rotatably journal a pair of roller-shoes 52 and 53, each having an arcuately grooved face substantially complemental with the superficial radius of the pipe-section B. The purpose of the roller-shoes is to grip the pipe-section B in co-operation with the roller 27 and allow longitudinal movement of the pipe-section B by the rotation of the roller 27 and the roller-shoes 52 and 53. The upper ends of the arms 48 and 49 each journal a roller bearing 54 and 55, respectively, in a similar manner as described hereinabove for the bearings 42 and 43. A suitable power-operated cylinder 56, similar to the cylinder 45, is similarly rigidly mounted adjacent the clamping arms 48 and 49. The cylinder 56 has a similar horizontally protruding piston rod with a conically shaped end 57 which performs the same function with relation to the bearings 54 and 55 as does the rod 46 with its associated bearings 42 and 43, as described hereinabove.

Two sets of clamps, as indicated by the letters C and D, respectively, are centrally mounted between the beams 3 and 12 adjacent the rollers 32 and 34. The sets of clamps C and D are preferably made of comparatively heavy material to positively axially align the respective pipe-sections A and B in co-operation with the two pairs of clamping arms 36—37 and 48—49. The set of clamps C consists of, a pair of plates 60 and 61 vertically disposed edgewise transversely of the beams 3 and 12 and are rigidly carried by the same in spaced-apart relation. The lower edge of the plates 60 and 61 each have an axially aligned arcuate recess 62, more clearly shown in Fig. 5, in co-operative axial alignment with the lower-most edge of the grooved faces of the rollers 23, 27, 32 and 34, and nests a circumferential portion of the pipe-section A (Fig. 5). Adjacent their upper edge the plates 60 and 61 are alignedly centrally perforated transversely to receive a pivot pin 63. The spacing of the plates 60 and 61 is such that they may closely receive a pair of upright opposing clamps 64 and 65 which are hingedly connected intermediate their ends by the pin 63. The lower ends of the clamps 64 and 65 are arcuately curved inwardly toward each other on a radius complemental to the superficial radius of the pipe-section A and are adapted to swing toward and away from the pipe A by pivoting on the pin 63, as shown by the dotted lines (Fig. 5). The upper ends of the clamps 64 and 65, respectively, are recessed to receive a pair of roller bearings 66 and 67 journaled on vertical axes for the purposes more fully explained hereinbelow.

The mounting of the clamp set D is somewhat different than that described by the set of clamps C, because it is desirable that the set D be movable longitudinally with relation to the beams 3 and 12. A pair of comparatively short channel members 70 and 71 are longitudinally disposed with their flanged edges outwardly between the upper and lower inwardly extending flanges of the H-beams 3 and 12, respectively (Fig. 6). The channels 70 and 71 may be slidably held in frictional contact by the beams 3 and 12, but to reduce the frictional resistance a preferred manner of mounting the channels 70 and 71 is shown in Figs. 11 and 12.

A vertically disposed roller bearing 73 is mounted on a vertical axle 74 adjacent both ends of the channels 70 and 71, respectively, and are carried by the upper and lower flanges of the channels 70 and 71, respectively. The circumferential edge of the rollers 73 rollably contacts the vertically disposed edge of the web 75 of the beams 3 and 12, thus preventing outward lateral movement of the channels 70 and 71. The channels are held in vertical spaced relation between the upper and lower flanges of the beams by four roller bearings 76 pivotally mounted by a horizontal axle and nut 77 through the web 75 in spaced-apart relation between the pairs of rollers 73. diametric size of the rollers 76 is such that they allow only enough vertical clearance between the roller and the upper and lower flanges of the channels 70 and 71 to allow the rollers 76 to revolve. The upper or the lower flanges of the respective channels 70 and 71 will bear against the roller 76 and prevent substantially all vertical movement of the channels 70 and 71 with relation to the beams 3 and 12.

A pair of plates 80 and 81, vertically disposed edgewise transversely of the channels 70 and 71, are rigidly carried by the same, as seen more clearly in Fig. 6. The lower edges of the plates 80 and 81 have axially aligned arcuate recesses 82 similar to the recess 62 of the plates 60 and 61. The forward edge of the plate 81 further has a pair of rigidly connected horizontal pressure blocks 83 and 84 extending a short distance toward the roller-shoes 52 and 53 for the purposes more fully explained hereinbelow. Adjacent their upper edge plates 80 and 81 are alignedly centrally perforated transversely to receive a pivot pin 85. The spacing of the plates 80 and 81 is such that they may closely receive a pair of hingedly connected clamps 86 and 87 similar to the clamps 64 and 65, and similarly mounted on the pin 85 and having their upper ends similarly equipped with vertically disposed rollers 88 and 89.

The space between the four centrally located vertical posts 7—8 and 15—16 are connected by a series of horizontal channel beams, two of which may be seen in Figs. 1 and 2 and are indicated by the reference numerals 90 and 91. A heavy horizontal metal plate 93 (Fig. 1) also spans the space between the four posts and is welded to the four vertical posts and to the horizontal channels 90 and 91 extending between the posts.

A heavy duty high pressure piston-chamber or hydraulic cylinder 94 is rigidly mounted centrally in vertical position on the plate 93 and is suitably anchored or braced with relation to the four central posts and their cross braces or the channels. The exact manner of rigidly anchoring the cylinder 94 to the frame, need not be specifically described as long as it is adequately strong. The cylinder 94 houses a vertically slidable ram or piston head, not shown, which may be of conventional construction as long as it is designed to withstand and operate under high hydraulic pressure. The lower end of this piston head is provided with a depending piston rod 95 which projects downwardly through the lower end of the cylinder 94. Integral with the lower end of the piston rod 95 is a depending mandrel 96 (Fig. 2). The upper portion of the mandrel 96 is substantially rectangular in horizontal cross section and has a vertical right angular recess cut from each corner. Four vertical rectangular guides 97 are nested within each recess, respectively, and are rigidly anchored to the frame and act to keep the mandrel 96 on the vertical center line as the piston rod 95 moves upwardly and downwardly. Intermediate its ends the four sides of the mandrel 96 are slanted downwardly and inwardly toward a central point. Two of the opposing slanting sides are disposed laterally of the frame, as shown in Fig. 7 and indicated by the reference numerals 98 and 99, while the other two are oppositely disposed longitudinally of the frame, as shown in Fig. 8, and indicated by the reference numerals 100 and 101. The vertical height of the mandrel 96 is such that when the piston rod 95 is fully extended, the lower ends of the downwardly converging sides of the mandrel stop at a point substantially even with the tops of the beams 3 and 12, and the point at which the lateral downwardly slanting sides 98 and 99 and the rearward side 100 begin is on a horizontal line, as indicated by the line 111 (Figs. 1 and 7), substantially equal with a horizontal center line which bisects the rollers 66—67 and 88—89 of the clamps C and D, for the purposes more fully explained hereinbelow. The point of starting the forward slanting side 101 is on a horizontal line slightly above the abovementioned line for the other three sides, for the purposes more fully explained hereinbelow.

Between the horizontal beams 3 and 12, there are anchored two heavy steel plates 103 and 104 which are equidistantly spaced forwardly and rearwardly of the center of the lower end of the mandrel 96. These plates are substantially identical, and the general configuration of the plate 104 may be seen in Fig. 7 of the drawings. The lower edges of the plates 103 and 104 have arcuately aligned recesses 102 in co-operative alignment with the recesses 62 and 82 of the clamps C and D. Adjacent their upper edges the plates 103 and 104 are alignedly perforated transversely in two corresponding places to receive two pivot pins 105 and 106 which pivotally mount one pair of pipe-clamps 107 and 108, respectively, intermediate their ends adjacent the forward side of the plate 104. The lower ends of the clamps 107 and 108 are co-operatively arcuately bowed inwardly, or similar radii, complemental to the exterior surface of the pipe-section to be handled and grip, in co-operation with the recess 102, substantially all of the circumferential extent of the pipe-section A. The clamps 107 and 108 each extend above their respective pivot pin, and the upwardly extending ends are each provided with small wheels 109 and 110, respectively, axially mounted on a horizontal pivot pin so that the circumferential face of the wheel rollably contacts the slanting surfaces 98 and 99, respectively. In Fig. 7 the mandrel 96 is shown in raised position, in dotted lines, and as the mandrel is lowered by the action of the piston rod 95, as shown in solid lines, the slanting sides 98 and 99 bear against the wheels 109 and 110, respectively, and pivot the upper ends of the clamps outwardly which causes their lower ends to grip the pipe-section A in co-operation with the recess 102.

A similar pair of pipe clamps 112 and 113 are similarly pivoted intermediate their ends on the pins 105 and 106 adjacent the rearward side of the plate 103. This pair of clamps are slidable longitudinally on the pins 105 and 106 for the purposes more fully explained hereinbelow. Adjacent their upper ends these clamps 112 and 113 are each provided with a ball bearing 114 and 115, respectively, to rollably contact the slanting side surfaces 98 and 99 for actuating the clamps 112 and 113 in a similar manner, as disclosed for the clamps 107 and 108, to grip the pipe-section B. When the wheels 109—110 and the balls 114—115 reach the upper limit of the slanting sides 98 and 99, as indicated by the line 111, by downward movement of the mandrel 96 further downward movement of the mandrel holds the clamps 107—108, and 112—113, in contact with the pipe-sections A and B by the vertical sides of the mandrel, but does not pivot the upper ends of the clamps outwardly any further.

A split plate 120 is rigidly connected to the upper surface of the mandrel 96 and envelops the forward and rearward sides of the mandrel in spaced relation thereto, as indicated by the numeral 121, having an identical configuration with relation to the slanting sides 100 and 101 and the vertical portion of the mandrel.

A horizontal push rod 122, cylindrical in general configuration, is slidably mounted in suitable bearings carried by suitable transverse cross beams 123 and 124 substantially on a level with relation to a horizontal center line of the wheels 109 and 110 and has its forward end equipped with a roller-wheel 125 axially journaled on a pivot pin 126. The circumferential face of the wheel 125 rollably contacts the slanting surface 100 of the mandrel. The pin 126 is substantially the same length as the width of the split plate 120 and is positioned within the space 121 in contact with the inner surface of the plate 120 and acts to hold the wheel 125 in contact with the slanting surface 100. The push rod 122 extends rearwardly of the mandrel 96 a selected distance from the clamp set C. Vertical movement of the mandrel 96 slidably reciprocates the push rod 122 longitudinally by the action of the wheel 125 against the slanting side 100 and the pin 126 within the space 121, as shown in dotted lines (Fig. 1). Intermediate its ends the push rod 122 is provided with an abrupt enlarged cylindrical bulge 127 having a rearwardly extending conical juncture 128 with the periphery of the rod 122. The budget 127 is positioned to contact the rollers 88 and 89 of the clamp set C and actuate the same to grip the pipe-section A. With the mandrel 96 in retracted or upward position and the push rod 122 in its extreme forward position, as shown in dotted lines (Fig. 1), the clamps C are in open position, as shown in dotted lines (Fig. 6). Downward movement of the mandrel 96 moves the push rod 122 rearwardly and the conical bulge 127 contacts the rollers 88 and 89 to pivot the clamps 86 and 87 to grip the pipe-section A. When the wheel 125 reaches the upper limit or line 111 of the slanting side 100, the cylindrical portion of the bulge 127 is centrally positioned between the rollers 88 and 89, and any further rearward movement of the push rod 122 is prevented by an adjustable stud-bolt 129 rigidly carried by the frame on a suitable transverse brace 129a.

A second push rod 130, identically formed with relation to the push rod 122, is similarly mounted forwardly of the mandrel 96 within the split plate 120 and has an axially mounted wheel 131 in contact with the forward slanting side 101 and a cylindrical bulge 132 for similarly actuating the clamp set D. The push rod 130 acts to move the clamp set D and the gripped pipe-section B toward the section A to contact their adjacent ends under considerable pressure in the following manner.

A heavy duty plate 135 is rigidly mounted transversely between the beams 3 and 12 forwardly of the clamp set D, having a pair of spaced apart transversely alignedly perforated bosses 136 to receive a horizontal pivot pin 137. A yoke 138, which straddles the pipe-section B, is pivotally connected intermediate its ends to the bosses 136 by the pin 137. The configuration of the yoke is more clearly shown in Fig. 10 of the drawings. The rearward face of the depending legs 139 of the yoke 138 contact a pair of rods 140 horizontally slidably carried by a suitable perforation in the lower portion of the plate 135 and having their rearmost ends rigidly connected to the pressure blocks 83 and 84, respectively, on the forward side of the plate 81 of the clamp set D. The yoke 138 extends upwardly a sufficient distance to be contacted by the forward end of the push rod 130. The forward slanting side 101 of the mandrel 96 extends upwardly slightly higher than the other three sides 98, 99 and 100, as is indicated by the reference numeral 142 (Fig. 1). When the mandrel 96 is moved downwardly to the position shown in solid lines (Fig. 1), the slanting sides 98, 99, 100 and 101 have actuated the pipe clamps 107—108 and 112—113 to grip the adjacent ends of the pipe-sections A and B and close the clamp sets C and D upon the pipe by the action of the push rods 122 and 130. Further downward movement of the mandrel then moves the push rod 130 pivoting the yoke 138 against the rods 140 which in turn slidably moves the clamp set D and the pipe-section B rearwardly, forcing the adjacent ends of the pipe-sections A and B together under high pressure. The pipe clamps 112—113 gripping the rearward end of the pipe-section B move with the pipe. To prevent the pipe clamps 112—113 from binding on its pivot pins 105 and 106, the mandrel 96 is provided with a pair of laterally extending slide blocks 145 and 146 which have upwardly and rearwardly slanting edges which contact the upper ends of the pipe clamps 112—113 and are on an angle which moves the upper ends of the clamps in co-operation with the movement of the pipe-section B and keeps the clamps vertically positioned. The balls 114—115 roll upon the vertical lateral side surface of the mandrel 96 during this operation, thus insuring positive gripping and force-rounding of the end of the pipe-section B.

To properly position the A-frame upon the pipe-section A with relation to the forward end of the pipe and to properly position the pipe-section B within the frame prior to the welding operation, a stop 150 is provided. As seen more clearly in Fig. 9 a relatively short piece of flatly disposed strap metal, rectangular in cross section, is abruptly turned downwardly at right angle at one end to form a depending leg 151. Substantially half of the rearward or right side of the leg 151, as seen in Fig. 9, is cut away by a right angular notch, leaving a horizontally disposed downwardly facing shoulder 152. Intermediate its ends the stop 150 is transversely perforated to receive a pivot pin 153. Adjacent the pivot pin 153 the end of the stop opposite the depending leg 151 is arcuately curved upwardly as at 154. As seen in Fig. 8, the stop 150 is pivotally connected forwardly of the plate 104 just above the recess 102 by the pivot pin 153. The stop 150 is positioned between the plates 103 and 104 so that the depending leg 151 is on the vertical center line of the mandrel 96. When the frame is placed in proper position upon the pipe-section A the shoulder 152 rests upon the topmost part of the pipe A with the leg 151 depending downwardly past the wall of the pipe A. The pipe-section B is then placed in the forward section of the A-frame and longitudinally slid rearwardly until its rearward end contacts the leg 151, the adjacent ends of the two pipe-sections A and B are then in properly spaced-apart relation for the welding operation. When the mandrel 96 has reached the limit of its downward movement for actuating the pipe gripping operation, as shown in solid lines in Figs. 1 and 7, the lower edge of the split plate 120 is in contact with the top of the arcuately curved portion 154 of the stop. Further downward movement of the mandrel 96, as described hereinabove for moving the pipe-section B into contact with the section A, causes the split plate 120 to pivot the stop 150 on its pin 153 and raise the leg 151 from between the adjacent ends of the pipe-sections A and B, as shown in dotted lines (Fig. 7).

As shown in Figs. 5, 6 and 7, suitable tension springs 156 may be connected to the depending ends of the various clamps and to their respective plates to aid in releasing the clamps from contact with the pipe after the mandrel 96 has been raised.

Conventional electrical welding power means, not shown, is connected to the pipe clamps 107—108 and 112—113, as is indicated by the wires 160. Similarly conventional electrical insulation, not shown, is placed around the clamps for safety, as may be desired.

Operation

In operation the device, with hydraulic cylinders in retracted position, is transported by a side boom of a tractor, not shown, attached to the headers 6 and placed upon a section of pipe A with the rollers 23 and 33 in contact with the surface of the pipe, with the forward end F projecting beyond the end of the pipe. The frame is properly positioned centrally with relation to the end of the pipe A by action of the stop 150, preventing any rearward movement of the frame. The hydraulic cylinder 45 as actuated to close the clamping shoes 40 and 41 into contact with the pipe A. A second section of pipe B is placed longitudinally into the frame from the forward end F in contact with the rollers 27 and 34 and moved rearwardly until its end contacts the stop 150, then the hydraulic cylinder 56 is actuated to close the roller-shoes 52 and 53 against the pipe B. Electric welding power is then turned on and the heavy duty cylinder 94 is actuated to lower the mandrel 96 which closes the clamp sets C and D and clamping jaws 107—108 and 112—113, axially aligning the pipe in the passage and force-rounding the adjacent ends of the pipe-sections A and B, and forces the pipe-section B into contact with the section A under sufficient pressure to allow the electric current to weld the adjacent ends of the pipe.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In an apparatus for axially aligning and flash or pressure welding the adjacent ends of two pipe sections the combination with, an A-frame of rigid construction having a pair of spaced-apart horizontal lower beams, of: a roller rotatably journaled adjacent each end of said frame between said beams for supporting said frame on one or more sections of pipe, said rollers having arcuately grooved faces adapted to contiguously contact a portion of the circumference of said pipe sections; a similar pair of rollers similarly journaled between said beams in spaced apart relation intermediate the ends of said beams for supporting said frame on the pipe; a pair of co-operating oppositely disposed vertical clamp arms pivotally mounted intermediate their ends by the innermost side of said beams, respectively, adjacent one remote end of said frame, said clamp arms each having a pivotally connected clamping shoe adjacent its lower end for gripping a circumferential portion of the pipe; a hydraulic cylinder rigidly carried by said frame operatively connected to the upper ends of said clamping arms for pivoting the same and forcing said shoes into gripping position against the pipe in co-operation with one said end roller; a second pair of similar clamping arms similarly mounted adjacent the opposite end of said frame, said clamping arms each having a roller-shoe rotatably journaled on its lower end, said roller-shoes each having arcuately grooved faces to contiguously contact a portion of the circumference of a pipe section; a second hydraulic cylinder rigidly carried by said frame operatively connected to the upper ends of said second pair of clamping arms for pivoting the same and forcing said roller-shoes into rotatable gripping contact with the pipe in co-operation with the other said end roller; a pair of plates rigidly carried by said beams adjacent one said intermediate roller, said plates each having a recess adapted to nest a circumferential portion of one said pipe section, said recess forming an axially aligned longitudinal pipe receiving passage in co-operation with said roller and said clamping arms; a pair of clamps disposed between said plates and pivotally connected thereto, said clamps each having an upstanding portion extending above the upper edge of said plates and an arcuately curved depending portion adapted to swing together for gripping substantially all of the remaining circumferential portions of one said pipe section; a pair of relatively short channel members longitudinally slidably carried by the innermost sides of said beams adjacent the other said intermediate roller; a second pair of similar plates having a similar recess rigidly carried by said channel members and movable therewith; a similar pair of clamps similarly mounted between said similar plates and movable therewith; two sets of pipe-clamps mounted in relatively close spaced-apart relation in the central portion of the frame between said intermediate rollers and in coaxial alignment with said rollers and said pipe receiving passage, said sets each consisting of a plate having an arcuate pipe receiving recess and arcuate clamping jaws pivotally mounted on the plate, one of said sets being movable toward and away from the other said set; a hydraulically actuated vertically movable mandrel having downwardly converging slanting sides, two of said sides adapted for actuating the jaws of said sets of pipe-clamps by downward movement of said mandrel to clamp the adjacent ends of two pipe sections and force-round the same; operative connections between said mandrel and said pairs of clamps to actuate the same to grip the pipe, by downward movement of said mandrel, and to force one said pipe section into end-abutting relation with the other said section; and a source of supply operatively connected to said sets of pipe-clamps for flash welding the abutted pipe ends, said connecting source of supply including, electric current generators, electric wiring and transformers connecting said generators to said sets of pipe-clamps.

2. Structure as specified in claim 1, in which said pipe clamping and gripping elements are all electrically insulated from the frame.

3. In an apparatus for axially aligning and flash or pressure welding the adjacent ends of two pipe sections the combination with, an A-frame of rigid construction having horizontal lower beams defining a longitudinal pipe receiving passage of: a plurality of rollers rotatably carried by said beams for supporting said A-frame on said pipe; hydraulically operated clamping means carried by the beam adjacent the remote ends thereof for gripping the pipe in co-operation with said rollers; two sets of clamping means carried by the beams intermediate their ends for axially aligning the pipe sections, one said set being movable longitudinally of said beams; two sets of hydraulically operated pipe clamping jaws mounted adjacent each other in the central portion of the beams for force-rounding and aligning the adjacent ends of the pipe sections, one said set being movable toward the other said set; a hydraulically operated vertically movable mandrel centrally carried by said frame, said mandrel having opposing downwardly converging slanting sides, two of said sides co-acting with said clamping jaws to close the latter by downward movement of said mandrel; operative conections between said intermediate clamping means so constructed and so arranged for closing said clamping means by downward movement of said mandrel to move said slidable clamp and said section of pipe longitudinally of said beams, thereby forcibly abutting the free ends of said pipe sections; and a source of supply operatively connected to said sets of pipe-clamping jaws for flash welding the abutted pipe ends, said source of supply including, electric current generators, electric wiring and transformers connecting said generators to said sets of pipe-clamps.

4. In an apparatus for axially aligning and flash or pressure welding the adjacent ends of two pipe sections, the combination with, a mobile frame of rigid construction having a longitudinal pipe receiving passage, of: a roller, mounted at each end of said passage, said rollers each mounted on a pivotal axis lying transverse to said passage and having arcuately grooved faces for contiguously contacting a portion of the circumference of said pipe; clamping means carried by said frame and mounted adjacent each end, respectively, of said passage in co-axial alignment with said rollers for gripping the pipe in co-operation with said rollers, one said clamping means adapted for allowing longitudinal movement of one said pipe section therein; two sets of clamping means mounted on the frame in spaced-apart relation intermediate the ends of said passage in co-axial alignment with said rollers, one said set slidably movable toward and away from the other said set; two sets of pipe-clamps mounted adjacent each other in the central portion of the frame between the second said clamping means and in co-axial alignment with said rollers, one said set slidably movable toward the other said set; power means for actuating the first and second said clamping means and said pipe-clamps to grip and align the said two sections of pipe within said passage and force-round the adjacent ends of said pipe sections, said power means slidably moving one said clamping means and one said set of pipe-clamps and their associated one section of pipe to forcibly abut the adjacent ends of said pipe sections; and a source of supply operatively connected to said sets of pipe-clamps for flash welding the abutted ends of said pipe sections, said source of supply including, electric current generators, electric wiring and transformers connecting said generators to said sets of pipe-clamps.

5. Structure as specified in claim 4 in which the said pipe-clamps are electrically insulated from the frame.

6. Structure as specified in claim 4 in which the rollers are the sole means for supporting the frame in a mobile manner on said pipe sections.

7. In an apparatus for axially aligning and flash or pressure welding the adjacent ends of two pipe sections the combination with, an A-frame of rigid construction having a pair of horizontal lower beams defining a longitudinal pipe receiving passage of: a roller mounted at each end of said passage, said rollers each mounted on a pivotal axis lying transverse to said passage and having arcuately grooved faces for contiguously contacting a portion of the circumference of said pipe; hydraulically operated clamping means carried by the beams adjacent one end of said frame in axial alignment with said passage for gripping and holding one said section of the pipe in co-operation with said end roller; hydraulically operated clamping means carried by said beams adjacent the other said end of said frame in axial alignment with said passage for gripping the other said section of pipe, said clamping means having arcuately grooved roller-shoes adapted to grip a portion of the circumference of the pipe and allow longitudinal movement of said section of pipe; two sets of hydraulically operated clamping means carried by said beams in spaced-apart relation intermediate their ends in axial alignment with said passage for rigidly holding said pipe sections at points spaced from their adjacent ends, one set of said clamping means being longitudinally slidable with relation to said beams; two sets of pipe clamping means mounted adjacent each other in the central portion of the frame in co-axial alignment with said passage for gripping the adjacent ends of said pipe sections, one said set being movable toward and away from the other said set; hydraulic power means to actuate said sets and said clamping means to grip the pipe and to forcibly move one said pipe section into end-abutting relation with the other said pipe section; and supply means operatively connected to said sets of pipe-clamps for flash welding the abutted pipe ends, said supply means including, electric current generators, electric wiring and transformers connecting said generators to said sets of pipe-clamps.

8. Structure as specified in claim 7 in which said pipe-clamps are electrically insulated from said A-frame structure.

No references cited.